United States Patent [19]

Uchinami et al.

[11] Patent Number: 5,699,769
[45] Date of Patent: Dec. 23, 1997

[54] CONTROLLER FOR FOUR-STROKE CYCLE INTERNAL-COMBUSTION ENGINE

[75] Inventors: Masanobu Uchinami; Koichi Yamane; Wataru Fukui, all of Tokyo, Japan

[73] Assignee: Mitsubishi Denki Kabushiki Kaisha, Tokyo, Japan

[21] Appl. No.: 636,144

[22] Filed: Apr. 22, 1996

[30] Foreign Application Priority Data

Oct. 6, 1995 [JP] Japan .................. 7-260313

[51] Int. Cl.$^6$ ........................................ F02P 7/067
[52] U.S. Cl. ............................... 123/414; 123/476
[58] Field of Search ............................. 123/414, 612, 123/613, 617, 476

[56] References Cited

U.S. PATENT DOCUMENTS

| | | | |
|---|---|---|---|
| 4,889,094 | 12/1989 | Beyer et al. | 123/414 |
| 4,951,628 | 8/1990 | Matsuoka et al. | 123/414 |
| 4,959,996 | 10/1990 | Akasu | 123/414 |
| 5,010,864 | 4/1991 | Matsuoka et al. | 123/414 |
| 5,184,590 | 2/1993 | Hashimoto et al. | 123/414 |
| 5,186,144 | 2/1993 | Fukui | 123/414 |
| 5,333,586 | 8/1994 | Fujui | 123/414 |
| 5,497,748 | 3/1996 | Ott et al. | 123/414 |
| 5,554,802 | 9/1996 | Fukui et al. | 73/117.3 |
| 5,606,257 | 2/1997 | Krauter et al. | 123/414 |

FOREIGN PATENT DOCUMENTS 1219342  9/1989  Japan .

*Primary Examiner*—Willis R. Wolfe
*Attorney, Agent, or Firm*—Sughrue, Mion, Zinn, Macpeak & Seas, PLLC

[57] ABSTRACT

A controller for a four-stroke cycle internal-combustion engine, which has a single sensor mounted on a crankshaft and employs a single sequence of position signal pulses corresponding to crank angles, achieves reduced cost and higher accuracy even for an engine with an odd number of cylinders. For each revolution of the crankshaft, a position signal pulse is issued from the sensor mounted on the crankshaft; the position signal pulse includes a reference position signal pulse in a number which is a multiple of N of the number of cylinders and a cylinder identifying signal pulse for a particular cylinder every time the crankshaft rotates. A control means includes a reference position signal generating section for identifying the reference position of each cylinder from the position signal pulse and for generating the reference position signal; a cylinder identifying section for identifying each cylinder from the position signal pulse and for generating a cylinder identifying signal; and a timing control section for generating a control signal for each cylinder in accordance with the reference position signal and the cylinder identifying signal. The control signal controls at least the ignition timing or the fuel injection timing of each cylinder.

15 Claims, 11 Drawing Sheets

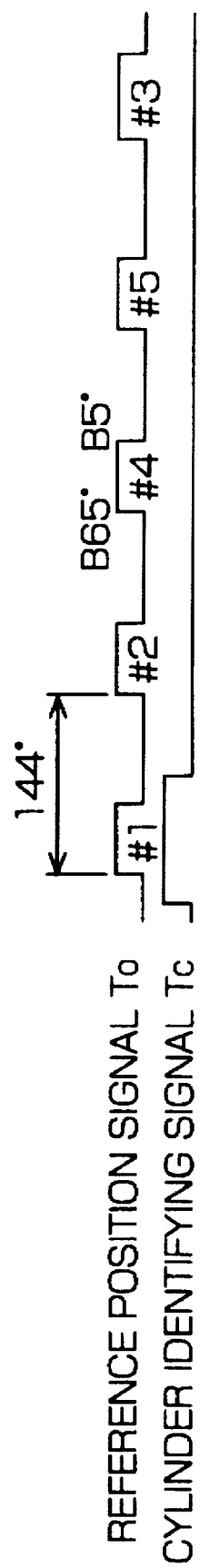

5,699,769

1

CONTROLLER FOR FOUR-STROKE CYCLE INTERNAL-COMBUSTION ENGINE

BACKGROUND OF THE INVENTION

1. Field of the Invention

The present invention relates to a controller for a four-stroke cycle internal-combustion engine, which controller is designed to control the fuel injection timing and the ignition timing of each cylinder in accordance with only a position signal received from a sensor installed on a crankshaft and, more particularly, to a controller for a four-stroke cycle internal-combustion engine which enables a highly accurate reference position of each cylinder and which achieves reduced cost.

2. Description of the Related Art

In most four-stroke cycle internal-combustion engines for automotive engines and the like, four strokes, namely, the strokes for the induction, compression, power, and exhaust, of a fuel-air mixture take place. For successful series of the four strokes, it is necessary to optimally control the fuel injection timing and the ignition timing according to operating conditions.

The rotary shaft indicating the reference position of each cylinder, therefore, is provided with a signal generating means including a sensor. Also used is a microprocessor which recognizes the reference position of the crank angle of each cylinder in accordance with the reference position signal and computes the control timing for ignition and the like to perform timer control from the reference position.

FIG. 10 is a block diagram showing a conventional controller for a four-stroke cycle internal-combustion engine; FIG. 11 is a perspective view illustrative of a specific configurations of a reference position signal generating means and a cylinder identifying signal generating means shown in FIG. 10; and FIG. 12 is a timing chart showing the waveforms of the reference position signal pulse and the cylinder identifying signal pulse involved in FIG. 10 and it shows an example wherein a four-stroke cycle internal-combustion engine driven by five cylinders is employed.

In FIG. 10, a reference position signal generating means generates a reference position signal, To, which corresponds to a crank angle reference position for each cylinder in synchronization with the revolution of the internal-combustion engine. A cylinder identifying signal generating means 2 generates a cylinder identifying signal pulse Tc for identifying a particular cylinder (cylinder #1) in synchronization of the revolution of the internal-combustion engine.

The reference position signal generating means and the cylinder identifying signal generating means 2 are constructed, for example, by crankshafts or rotating slits provided in cam shafts and photocouplers facing against the rotating slits as they will be discussed hereinafter.

A control means 3 consisting of a microprocessor recognizes the reference position of each cylinder in accordance with the reference position signal To and the cylinder identifying signal pulse Tc, computes the ignition timing and the like according to various operating conditions, and issues a control signal Q, i.e. a signal for cutting off the current supplied to an ignition coil, which matches the ignition timing.

The control means 3 is equipped with a cylinder identifying unit 31 for generating a cylinder identifying signal F in accordance with the reference position signal To and the cylinder identifying signal pulse Tc, and a timing control section 32 for generating the control signal Q (ignition

2 timing, etc.) of each cylinder in accordance with the reference position signal To, the cylinder identifying signal F, and operating conditions.

In FIG. 11, the reference position signal generating means 1 and the cylinder identifying signal generating means 2 are equipped with: a rotating signal disc 11, which is provided integrally with a cam shaft 10 revolting in synchronization with the internal-combustion engine; a plurality of slits 12 and 13 which are concentrically arranged in the rotational direction of the signal disc 11; light emitting devices 15 and 17 which are arranged so that they face against the slits 12 and 13; and photoreceptors 16 and 18 which are arranged so that they face against the respective light emitting devices 15 and 17 via the respective slits 12 and 13.

The cam shaft 10 and the signal disc 11 rotate once while a crankshaft, which is not shown, rotates twice. Of the slits 12 and 13 in the signal disc 11, the outer slits 12 are keyed to the reference position signal To of each cylinder and the inner slit 13 is keyed to the cylinder identifying signal pulse Tc of a particular cylinder.

The light emitting device 15 and the photoreceptor 16 constitute a photocoupler which is arranged so that it faces against the slits 12 keyed to the reference position signal To. The light emitting device 17 and the photoreceptor 18 constitute a photocoupler which is arranged so that it faces against the slit 13 keyed to the cylinder identifying signal pulse Tc.

In FIG. 12, the reference position signal consists of a pulse waveform which rises at a crank angle in a first reference position, B65 degrees, i.e. 65 degrees before a top dead center (TDC), of respective cylinders (#1 to #5) and which falls at a crank angle in a second reference position, B5 degrees. The first reference position, B65 degrees, indicates the base reference position on the maximum advance side; the second reference position, B5 degrees, indicates the initial reference position.

In terms of crank angle, in the reference position signal To, the full cycle of the five cylinders corresponds to 720 degrees; the pulse cycle for each cylinder equals 144 degrees; and the pulse width from the base reference (first) position, B65 degrees, to the initial (second) reference position, B5 degrees, for each cylinder equals 60 degrees. Accordingly, the pulse width from the initial reference position, B5 degrees, of one cylinder to the base reference position, B65 degrees, of the next cylinder equals 84 degrees.

The cylinder identifying signal pulse Tc of a particular cylinder, i.e. #1 in this case, is comprised of a waveform which has a different phase from that of the reference position signal To so that the signal level with respect to the reference positions, B65 degrees and B5 degrees, is different from those of other cylinders. For instance, as shown in FIG. 12, the particular cylinder, namely, #1, is identified by the signal level of the cylinder identifying signal pulse Tc indicating "1" in the first reference position, B65 degrees, and "1" in the second reference position, B5 degrees.

With reference to FIG. 11 and FIG. 12, the operation of the conventional controller for the four-stroke cycle internal-combustion engine will now be described.

When the internal-combustion engine revolves, the reference position signal generating means 1 and the cylinder identifying signal generating means 2 respectively generate the reference position signal To and the cylinder identifying signal pulse Tc shown in FIG. 12. The reference position signal To is supplied to the cylinder identifying unit 31 and the timing control section 32 incorporated in the control means 3; and the cylinder identifying signal pulse Tc is supplied to the cylinder identifying unit The cylinder identifying unit 31 identifies each cylinder according to the reference position signal To and the cylinder identifying signal pulse Tc and issues the cylinder identifying signal F. The timing control section 32 identifies the cylinder to be controlled according to the reference position signal To and the cylinder identifying signal F and issues the control signal Q which corresponds, for example, to the fuel injection timing and the ignition timing. If the ignition timing is on the advance side, then the timer control based on the first reference position, B65 degrees, is conducted; if the ignition timing is on the lag side, then the timer control based on the second reference position, B5 degrees, is conducted.

The reference position signal generating means however, is mounted on the cam shaft 10 together with the cylinder identifying signal generating means, the cam shaft being an interlocked shaft which is mechanically connected to the crankshaft. The crank angles indicated by the respective reference positions, B65 degrees and B5 degrees, obtained from the slits 12 in the signal disc 11 which is coaxial with the cam shaft 10 include the errors of transmission from the crank shaft; therefore, no accurate reference positions are available for the timing control section 32 to control the internal-combustion engine.

In addition, the reference position signal To is required to be highly accurate because it is used not only for controlling the ignition timing described above but also for detecting a change in revolution according to the cycle ratio of the respective reference positions and for detecting a misfire according to a change in revolution.

It is known that the reference position signal generating means 1 should be mounted on the crankshaft to achieve high accuracy of the respective reference positions, B65 degrees and B5 degrees. If, however, there are an odd number of cylinders to be controlled, an odd number of pulse signals corresponding to the respective cylinders cannot be output while the engine rotates twice. As a result, the positions during one revolution of the crank shaft cannot be keyed to the respective cylinders, making it impossible to generate a reasonable reference position signal To.

A typical known conventional configuration of the controller for an internal-combustion engine driven by an odd number of cylinders includes the crank shaft provided with the reference position signal generating means 1. However, it is impossible to associate an obtained reference position signal To with a proper cylinder simply by providing the crankshaft with the reference position signal generating means 1. For this reason, the cylinder identifying signal generating means 2 is also mounted on the cam shaft 10 and the timing control is implemented by using two types of signals, namely, the reference position signal To and the cylinder identifying signal pulse Tc.

For the purpose of improvement, a cylinder identifying apparatus which employs a single signal sequence has been proposed in Japanese Patent Publication No. 7-58058, for example. In this apparatus, the signal waveform which is obtained in relation to the cam shaft 10 is designed so that it permits both reference position detection and cylinder identification; however, the reference position signal generating means 1 is not directly mounted on the crankshaft. Hence, each reference position inevitably includes the transmission error mentioned above, preventing the control based on accurate reference positions.

Thus, in the conventional controller for the four-stroke cycle internal-combustion engine, especially when the engine has an odd number of cylinders, since the reference position signal generating means 1 is mounted on the cam shaft 10, the respective reference positions, B65 degrees and B5 degrees, obtained from the reference position signal To unavoidably contain the transmission error from the crankshaft, presenting a problem in that control based on accurate reference positions cannot be accomplished.

There is another problem: even when the reference position signal generating means 1 is provided on the crankshaft in the case of an even number of cylinders, the cylinder identifying signal generating means 2 must be also provided on the cam shaft 10 and two signal sequences must be used to implement the timing control, resulting in higher cost.

There is still another problem: even in the apparatus wherein the pulse signal waveform received from the signal generating means is designed so that both the detection of reference positions and the identification of cylinders may be accomplished by only one signal sequence, since the signal generating means is not directly mounted on the crankshaft, the reference positions inevitably include transmission errors, preventing the control based on accurate reference positions.

SUMMARY OF THE INVENTION

The present invention has been made with a view toward solving the problems described above and it is therefore an object of the present invention to provide a controller for a four-stroke cycle internal-combustion engine which has achieved lower cost of the whole apparatus and also achieved the control based on highly accurate reference positions even in the case of a four-stroke cycle internal-combustion engine having an odd number of cylinders by directly mounting a position signal generating means composed of a single sensor on a crankshaft and by employing position signal pulses which include reference position signal and cylinder identifying signal pulses of a single signal sequence keyed to crank angles regardless of whether the number of cylinders is odd or even.

According to one aspect of the present invention, there is provided a controller for a four-stroke cycle internal-combustion engine having an odd number of cylinders, the controller comprising: position signal generating means mounted on a crankshaft of the internal-combustion engine for generating a position signal in synchronization with the revolution of the crankshaft, the position signal including a reference position signal pulse which is generated in a plurality of pulses during each revolution of the crankshaft and a cylinder identifying signal pulse which is generated for a particular cylinder, the number of the reference position signal pulses generated during each crankshaft revolution being a multiple of N (N is a natural number) of the number of cylinders; a reference position signal generating section for identifying a reference position for each cylinder from the position signal pulse and for generating the reference position signal; a cylinder identifying section for identifying the respective cylinders from the position signal pulse and for generating a cylinder identifying signal; and a timing control section for generating a control signal for the each cylinder in accordance with the reference position signal and the cylinder identifying signal.

According to another aspect of the present invention, there is provided a controller for a four-stroke cycle internal-combustion engine having an even number of cylinders, the controller comprising: position signal generating means mounted on a crankshaft of the internal-combustion engine for generating a position signal in synchronization with the revolution of the crankshaft, the position signal including a reference position signal pulse which is generated in a plurality of pulses during each revolution of the crankshaft and a cylinder identifying signal pulse which is generated for a particular cylinder, the number of the reference position signal pulses generated during each crankshaft revolution being a multiple of N/2 (N is a natural number) of the number of cylinders; a reference position signal generating section for identifying the reference position of the each cylinder from the position signal pulse and for generating the reference position signal; a cylinder identifying section for identifying the each cylinder from the position signal pulse and for generating a cylinder identifying signal; and a timing control section for generating a control signal for the each cylinder in accordance with the reference position signal and the cylinder identifying signal.

In a preferred form, the controller in accordance with the present invention is designed so that the control signal controls ignition timing or fuel injection timing for each of the cylinders at each of the reference position signals given in a number of pulses which is a multiple of N of the number of cylinders during one revolution of the crankshaft.

In another preferred form, the controller in accordance with the present invention is designed so that the control signal controls ignition timing or fuel injection timing for each of the cylinders at each of the reference position signals given in a number of pulses which is a multiple of N/2 of the number of the cylinders during one revolution of the crankshaft.

In a further preferred form, the controller in accordance with the present invention further comprises: dividing means for halving the reference position signal to generate divided reference position signals; and cylinder identifying means for controlling ignition timing or fuel injection timing of one of the odd number of cylinders once for every two revolutions of the crankshaft in accordance with the divided reference position signal, for checking whether the combustion state of the controlled cylinder indicates a misfire or not according to a change in the rotational speed of the crankshaft, and for identifying a true reference position signal for a compression stroke of the each cylinder according to the checking result of the combustion state.

In a still further preferred form, the controller in accordance with the present invention further comprises: cylinder identifying means for controlling ignition timing or fuel injection timing of one of the even number of cylinders once for every two revolutions of the crankshaft in accordance with the reference position signal, for checking whether the combustion state of the controlled cylinder is a misfire or not according to a change in the rotational speed of the crankshaft, and for identifying a true reference position signal for a compression stroke of the each cylinder according to the checking result of the combustion state.

BRIEF DESCRIPTION OF THE DRAWINGS

FIG. 12 is a timing chart showing a reference position signal and a cylinder identifying signal which are generated by the conventional controller for the four-stroke cycle internal-combustion engine.

DETAILED DESCRIPTION OF THE PREFERRED EMBODIMENTS

First Embodiment

The first embodiment according to the present invention will be described with reference to the accompanying drawings.

Figure 1:
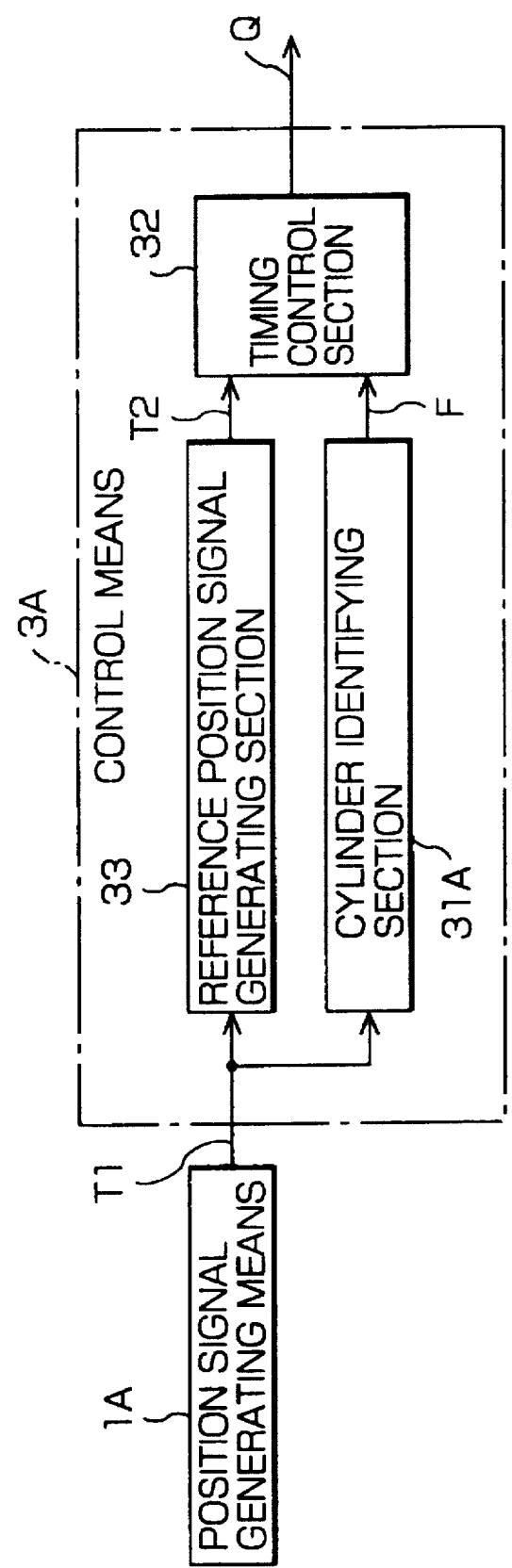
FIG. 1 is a block diagram showing a schematic functional configuration of a first embodiment in accordance with the present invention.
Figure 2:
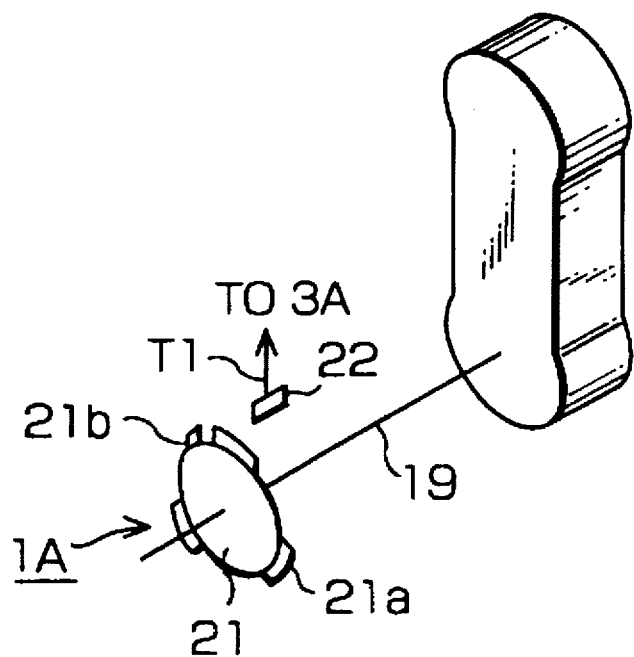
FIG. 2 is a perspective view showing a specific configuration of a position signal generating means shown in FIG. 1.
Figure 3:
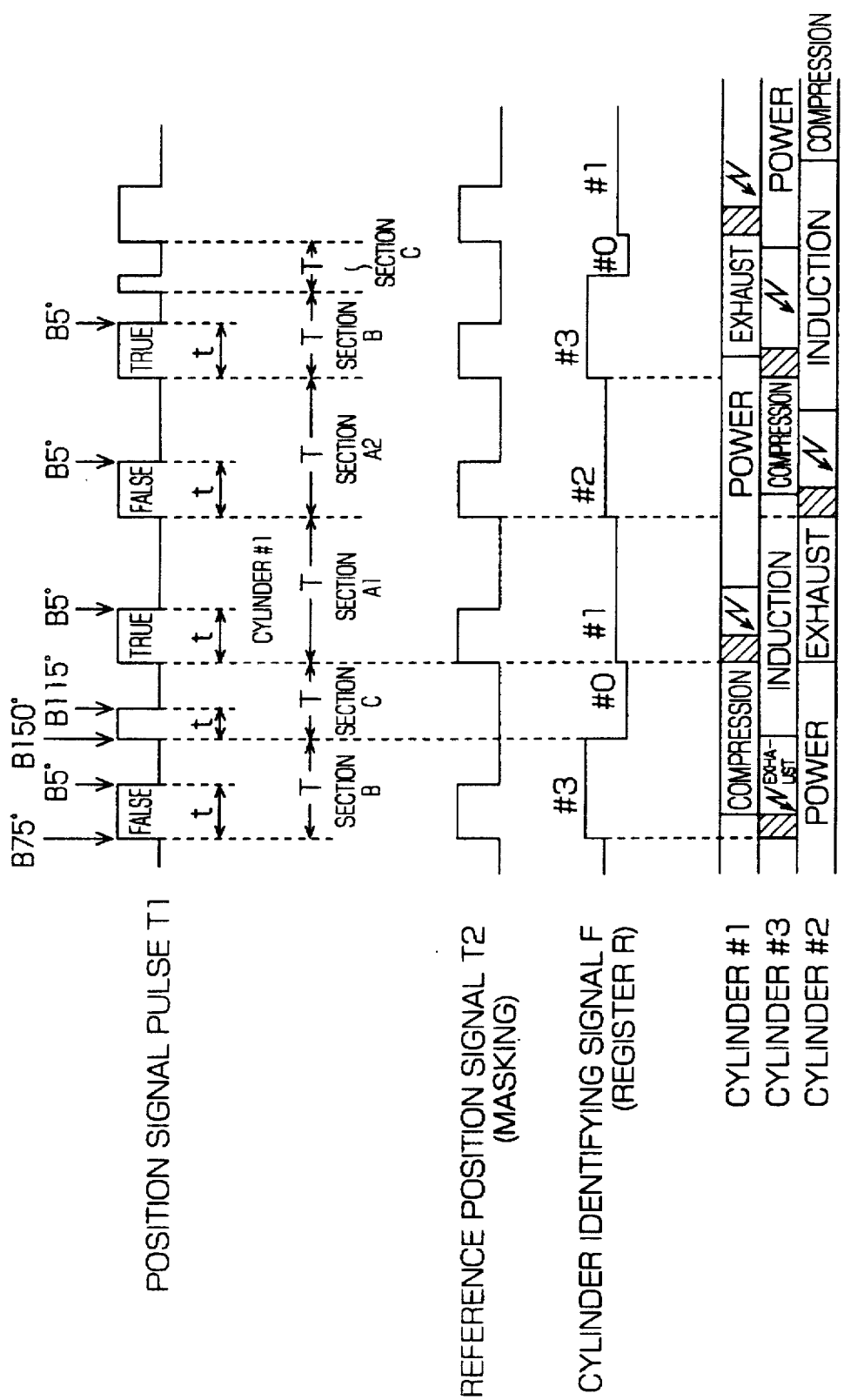
FIG. 3 is a timing chart illustrative of the pulse waveforms of respective signals for the control of the fuel injection and ignition timings performed by the first embodiment.
Figure 4:
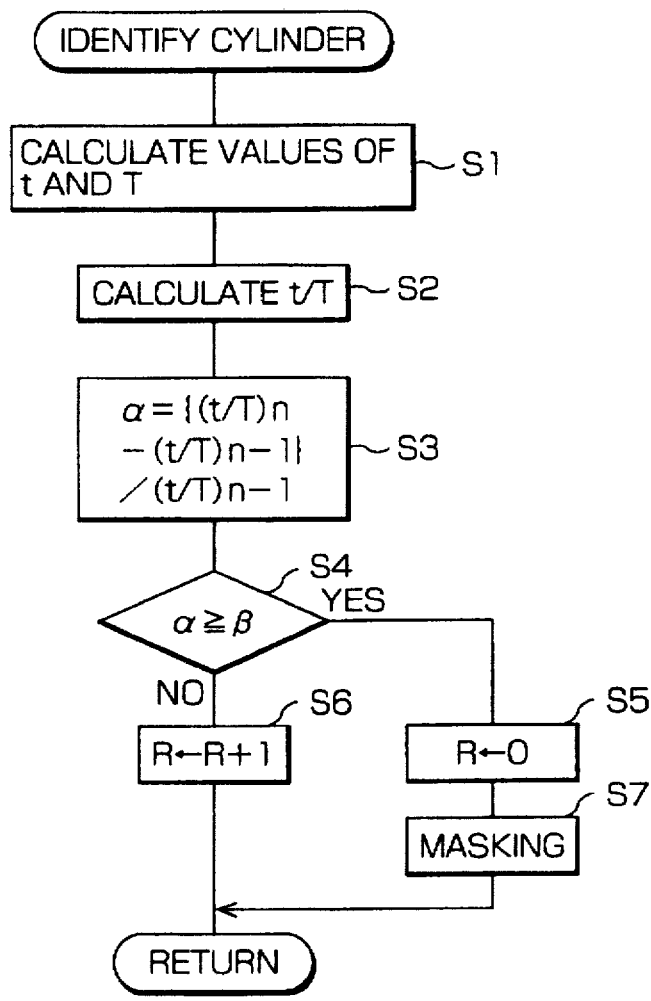
FIG. 4 is a flowchart illustrative of the cylinder identifying operation performed by the first embodiment in accordance with the present invention.

FIG. 1 is the block diagram showing the first embodiment of the present invention; FIG. 2 is the perspective view showing the specific configuration of a position signal generating means 1A shown in FIG. 1; FIG. 3 is the timing chart illustrative of the waveforms of the position signal pulse and respective signals shown involved in FIG. 1; and FIG. 4 is the flowchart illustrative of the operation of the cylinder identifying section shown in FIG. 1. The first embodiment shows a case wherein a four-stroke cycle internal-combustion engine having an odd number of cylinders, namely, three cylinders is employed.

Figure 10:
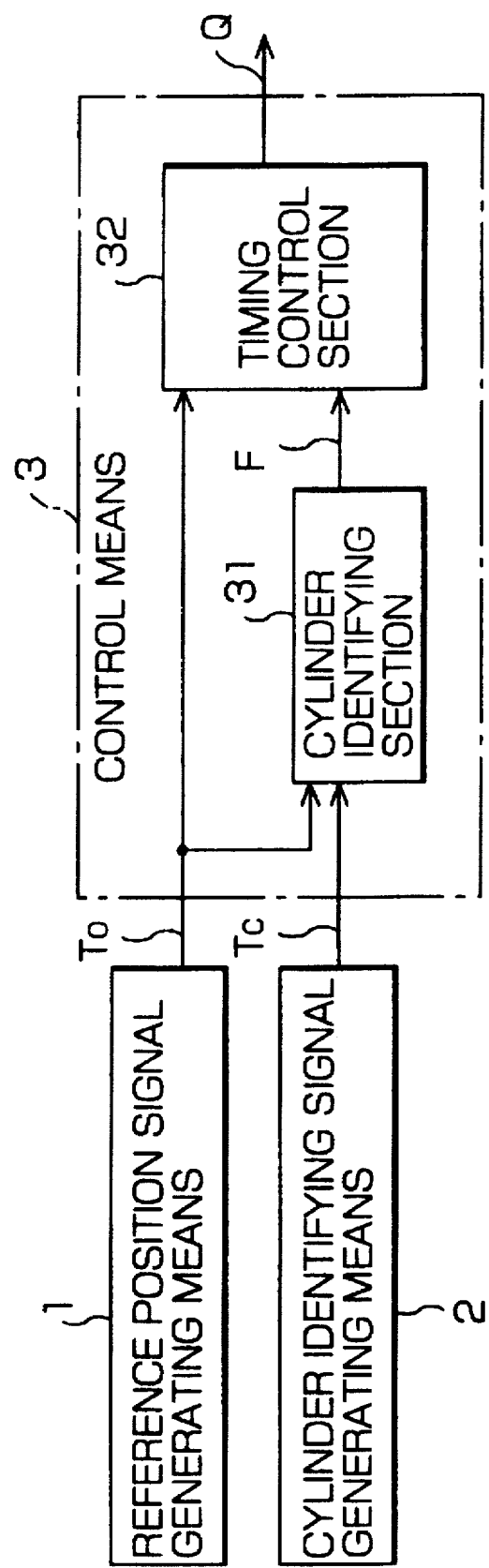
FIG. 10 is a block diagram showing a schematic configuration of a conventional controller for a four-stroke cycle internal-combustion engine.

In FIG. 1, the position signal generating means 1A, a control means 3A, a cylinder identifying section 31A, and a reference position signal T2 respectively correspond to the reference position signal generating means 1, the control means 3, cylinder identifying section 31, and the reference position signal To stated above and shown in FIG. 10. The timing control section 32, the cylinder identifying signal F, and the control signal Q are the same as those described above.

The position signal generating means 1A generates a total of four position signal pulses T1 consisting of the pulses given in a number which is a multiple of N (N=1) of the number of cylinders in synchronization with the revolution of the crankshaft and one pulse for identifying the cylinder.

The control means 3A is equipped with a reference position signal generating section 33 which generates the reference position signal T2 in accordance with the position signal pulse T1, the cylinder identifying section 31A which generates the cylinder identifying signal F in accordance with the position signal pulse T1, and the timing control section 32 which generates the control signal Q for each cylinder in accordance with the reference position signal T2 and the cylinder identifying signal F.

The cylinder identifying section 31A identifies a position signal pulse, which is associated with a particular cylinder, according to the intervals among the respective pulses of the position signal pulse T1 and it generates the cylinder identifying signal F. The reference position signal generating section 33 generates the reference position signal T2 consisting of a constant-interval pulse string by taking out only the pulse signals of constant-interval pulse strings according to the intervals among the respective pulses of the position signal pulse T1.

In FIG. 2, a crankshaft 19 directly connected to the internal-combustion engine is linked to the cam shaft 10 (see FIG. 11) via a mechanical transmitting means such as a timing belt and it rotates twice while the cam shaft 10 rotates once. The single position signal generating means 1A is integrally mounted onto the crankshaft 19.

Figure 11:
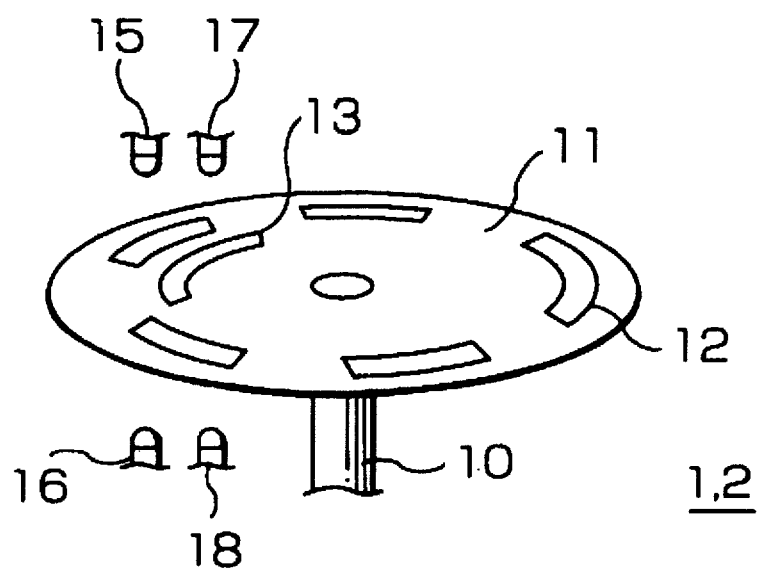
FIG. 11 is a perspective view showing a specific structure of a reference position signal generating means and a cylinder identifying signal generating means.

The position signal generating means 1A is constituted by a signal disc 21, which rotates together with the crankshaft 19 as one piece, a plurality of (corresponding to the number of the cylinders) projections 21a which are provided at equal intervals along the outer circumference of the signal disc 21, a single projection 21b provided on the outer circumference of the signal disc 21 so that it is keyed to a particular cylinder, and a sensor 22 comprised of reflection type photosensors or the like which is arranged so as to face against the projections 21a and 2lb. The sensor 22 may be constructed by the slits and the photocouplers as shown in FIG. 11.

The sensor 22 generates the position signal pulse T1 each time it faces against the projections 21a and 2lb as the signal disc 21 rotates. The projections 21a, which are arranged at equal intervals, correspond to the reference position signals T2 (constant-interval pulses) for the cylinders #1 to #3; the single projection 21b corresponds to the cylinder identifying signal F.

FIG. 3 shows the waveforms of the position signal pulse T1, the reference position signal T2 and the cylinder identifying signal F, and the control timings of the fuel injection and ignition for each cylinder controlled by the signals T1, T2, and F. In FIG. 3, the hatched parts indicate the fuel injection timings of the cylinders #1 to #3; the bent arrows indicate the ignition timings of the cylinders #1 to #3.

In FIG. 3, each position signal pulse T2 has a pulse width t and a pulse cycle T. The pulse rising timing, i.e. the first reference position, which corresponds to the reference position signal T2, is set to B75 degrees and the falling timing, i.e. the second reference position, is set to B5 degrees. Further, the rising timing of the pulse corresponding to the cylinder identifying signal F is set to B150 degrees and the falling timing is set to B115 degrees. The pulse cycle T between the first reference positions corresponds to each of sections A1, A2, B, and C.

The operation of the first embodiment of the present invention shown in FIG. 1 and FIG. 2 will now be described with reference to the timing chart of FIG. 3.

In the embodiment, the control means 3A generates the cylinder identifying signal F and the reference position signal T2 according only to the position signal pulse T1 which is synchronized with the revolution of the crankshaft 19 as previously mentioned. The timing control section 32 issues the control signal Q in accordance with the cylinder identifying signal F and the reference position signal T2.

First, when the internal-combustion engine revolves once, the crankshaft 19 and the signal disc 21 rotate once and the respective projections 21a and 21b on the signal disc 21 face against the sensor 22 in succession in synchronization with the revolution of the internal-combustion engine. This causes the position signal pulse obtained from the sensor 22 to be formed into the pulse waveform illustrated in FIG. 3A and supplied to the control means 3A.

At this time, the position signal pulse T1 is obtained based on the rotation of the crankshaft 19 directly connected to the internal-combustion engine; therefore the reference position indicated by the reference position signal T2 is free of transmission errors. This enables the reference position signal generating section 33 in the control means 3A to generate accurate reference position signal T2.

The cylinder identifying section 31A generates the cylinder identifying signal F based on the position signal pulse T1 according to the processing procedure given in FIG. 4.

The specific operation of the cylinder identifying section 31A will now be described in conjunction with the flowchart given in FIG. 4.

In step S1, the system calculates the pulse width t of the position signal pulse T1 and the pulse cycle T between the first reference positions by measuring the time.

In step S2, the system calculates a pulse time ratio t/T of the pulse width t in relation to the pulse cycle T in the respective sections, namely, A1, A2, B, and C. If there is no change in the revolution of the internal-combustion engine and the engine speed stays constant, then the value of pulse time ratio t/T will be 70/180 (≈0.389) for sections A1 and A2, 70/105 (≈0.667) for section B, and 35/75 (≈0.467) for section C.

Subsequently, in step S3, the time difference $\{(t/T)_n - (t/T)_{n-1}\}$ between the present value $(t/T)_n$ and the previous value $(t/T)_{n-1}$ is divided by the previous value $(t/T)_{n-1}$ so as to obtain time difference quotient value α as shown below:

$$\alpha = \{(t/T)_n - (t/T)_{n-1}\} / (t/T)_{n-1}$$

If there is no change in the revolution of the internal-combustion engine and the engine speed stays constant, then time difference quotient value α will be (0.389–0.467) / 0.467 (≈−0.167) for section A1, 0 for section A2, and (0.667–0.389) / 0.389 (0.715) for section B, and (0.467–0.667) / 0.667 (≈−0.3) for section C.

In step S4, time difference quotient value α is compared with a predetermined value β, e.g. approximately 0.2, to determined whether α≧β. If it is determined that α≧β, i.e. YES, then the section is obviously B (α≈0.715); therefore, it is seen that the next position signal pulse T1, which corresponds to section C, is the cylinder identifying signal pulse corresponding to a particular cylinder, namely, cylinder #1.

Hence, the system proceeds to step S5 wherein it clears the value in cylinder identifying register R to zero. Thus, when the cylinder identifying signal pulse which corresponds to a particular cylinder is detected, the system implements masking on the cylinder identifying signal pulse in step S7 to make it possible to create a waveform of only the reference position signal T2, skipping the cylinder identifying signal pulse, then it returns.

On the other hand, if it is determined in step S4 that α<β, i.e. NO, then the section is obviously A1 (α≈−0.167), A2 (α=0), or C (α≈−0.3); therefore it is seen that the next position signal pulse T1, which corresponds to sections A1, A2 and B, is the reference position signal T2 corresponding to the cylinders, namely, cylinders #1 to #3. Hence, the system advances to step S6 wherein it increments the value of cylinder identifying register R before it returns.

Thus, the value of cylinder identifying register R is cleared in response to the cylinder identifying signal pulse corresponding to a particular cylinder, namely, cylinder #1, and it is incremented in response to the reference position signal T2 corresponding to the cylinders #1 to #3.

Accordingly, the value of cylinder identifying register R indicates to which number of cylinder from the particular cylinder, namely, cylinder #1, corresponds to the reference position signal T2 and it therefore functions as the cylinder identifying signal F. After the cylinder is identified by the cylinder identifying signal F (register R), the timing control section 32 controls the fuel injection (see the hatched parts shown in FIG. 3) and the ignition (see the bent arrows shown in FIG. 3) by carrying out the timing control based on the reference position signal T2.

The fuel injection control and the ignition control will now be described in detail with reference to the timing charts given in FIG. 3 and FIG. 5. The fuel injection and ignition are controlled by a publicly known microprocessor, which is not shown, as disclosed, for example, in Japanese Patent Publication No. 7-58058.

Figure 5:
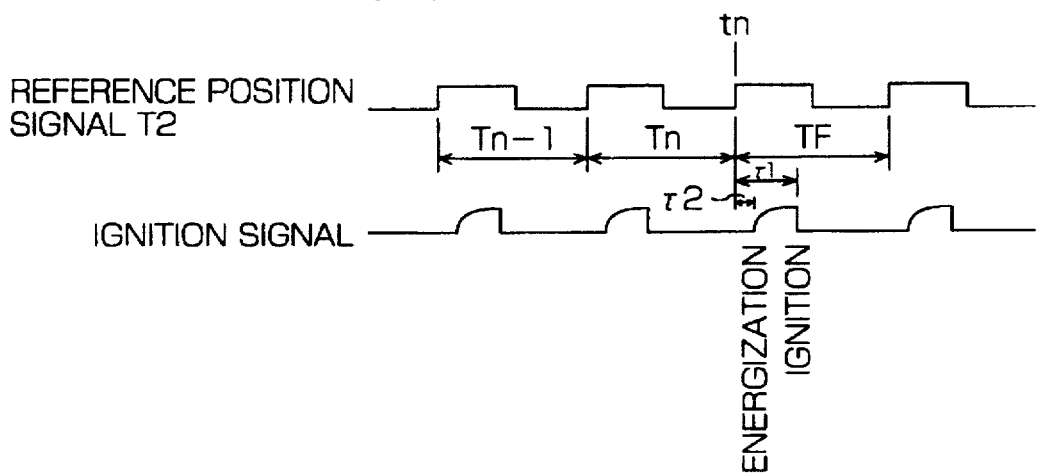
FIG. 5 is a timing chart for illustrating the ignition control operation performed by the first embodiment in accordance with the present invention.

Firstly, the ignition control is implemented by cutting off the supply of electric currents to an ignition coil, not shown, by an ignition signal generated according to the reference position signal T2 as shown in FIG. 5. More specifically, a next value TF of the pulse cycle of the reference pulse signal T1 is estimated from the previous value $Tn_{-1}$ and the present value Tn to determine control time $\tau1$ from reference point tn, which corresponds to the first reference position, to the ignition point.

Likewise, control time $\tau2$ from reference point tn to the start of energization is determined according to the energizing time required for the ignition coil. Thus the supply of electric currents to the ignition coil is started at a point where control time $\tau2$ has elapsed from reference point tn and the supply of electric currents to the ignition coil is cut off at a point where control time $\tau1$ has elapsed, thereby accomplishing the ignition.

At this time, when the cylinder under the ignition control is in the compression stroke, combustion actually takes place and the subsequent power stroke follows.

In order to detect the compression stroke of each cylinder, pulses of the reference position signal T2 in the number of the cylinders, i.e. three in this case, are required for one revolution of the cam shaft 10, which corresponds to two revolutions of the crankshaft 19.

According to the first embodiment of the present invention, however, pulses of the reference position signal T2 in the double number, namely, six, of the three cylinders are obtained for the two revolutions of the crankshaft 19 as shown in FIG. 2.

For instance, if the pulse of the reference position signal T2 of the compression stroke is taken as "true," then a pulse "false" of the reference position signal T2 for the concerned cylinder is obtained also after the crankshaft 19 turns 360 degrees. Therefore, the "true" reference position signal cannot be distinguished from the "false" reference position signal. This means that the pulses of the true and false reference position signals T2, which are given in synchronization with the compression strokes of the respective cylinders, are alternately obtained as illustrated in FIG. 3. As a result, the aforesaid ignition control indicated by the bent arrows is carried out for both true and false reference position signals T2. However, the ignition control which synchronizes with the false reference position signal T2 is conducted in the exhaust stroke of the engine; therefore, no substantial combustion takes place and there is no actual harm except for the waste of power.

The fuel injection control indicated by the hatched parts is conducted in the similar manner to that of the ignition control. More specifically, the fuel in an amount which is suited to the engine condition is injected in synchronization with the reference position signal T2. In other words, the fuel injection is carried out in the exhaust stroke or the compression stroke of the engine, depending on whether the timing is the false timing or the true timing.

Hence, there is a possibility of controlling the fuel injection timing in accordance with only the true timing by synchronizing the fuel injection with a signal which is obtained by halving the reference position signal T2.

However, at the time of start-up or the like at which the true and false reference position signals cannot be distinguished, the use of only one control timing affects the performance of the engine.

More specifically, a marked difference results in exhaust gas, accelerating performance, etc. according as whether the fuel injection timing is always synchronized with the exhaust stroke or the compression stroke. To solve this problem, this embodiment is designed to divide the amount of fuel required for the engine and inject the fuel in both exhaust stroke and induction stroke so as to absorb the variations in the engine performance.

Thus, the projections 21a of the same number as the odd number of cylinders and the projection 21b which corresponds to a particular cylinder are provided along the outer circumference of the signal disc 21 (see FIG. 2) to generate the single sequence of position signal pulse T1 in accordance with the respective projections 21a and 21b, and the time difference quotient value $\alpha$ of the pulse time ratio t/T of the position signal pulse T1 is obtained, thereby making it possible to identify the respective cylinders and to enable highly accurate detection of the reference positions by employing the simplified single sequence of position signal pulses T1.

Hence, at least the fuel injection control or the ignition control can be carried out by the single sensor related to the crankshaft 19, permitting highly accurate reference position signal T2 and reduced cost of the four-stroke cycle internal-combustion engine which has an odd number of cylinders.

In the first embodiment described above, the same number of the projections 21a as the number of cylinders are provided on the signal disc 21 as shown in FIG. 2; however, the number of the projections may alternatively be an arbitrary number of an N multiple of the natural number of the number of cylinders. Further, in the first embodiment, the fuel injection control is carried out only on the identified cylinders as indicated by the hatched parts shown in FIG. 3; however, the fuel injection control may alternatively be carried out on all cylinders at the same time as indicated by the hatched parts shown in FIG. 6.

Second Embodiment

The first embodiment described above refers to the case where the number of cylinders is odd; however, the present invention can be applied also to an internal-combustion engine which has an even number of cylinders.

The second embodiment wherein the invention is applied to the internal-combustion engine with an even number of cylinders will now be described, taking an example of a four-cylinder (#1 to #4) engine.

Figure 7:
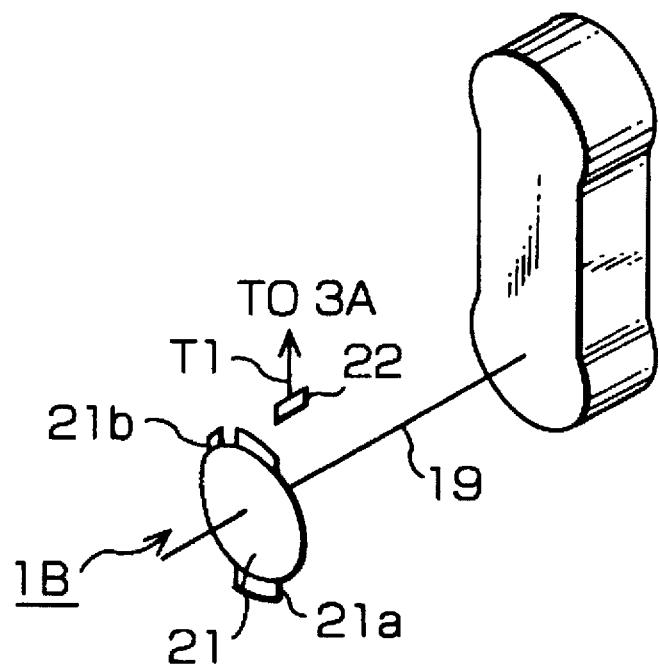
FIG. 7 is a perspective view showing a specific structure of a reference position signal generating means and a cylinder identifying signal generating means according to a second embodiment of the present invention.

FIG. 7 is the perspective view showing a position signal generating means 1B for an even number of cylinders. In the drawing, the control means 3A, the crankshaft 19, the signal disc 21, the projections 21a and 21b, the sensor 22, and the position signal pulse T1 are identical to those described above and shown in FIG. 2.

The configuration of the control means 3A is as shown in FIG. 1 and the functional block for generating the reference position signal T2 and the cylinder identifying signal F from the position signal pulse T1 and the principle for arithmetic processing are the same as those of the first embodiment.

In the second embodiment, the signal disc 21 for generating the position signal pulse T1 is provided with the projections 21a, which correspond to the reference position signals T2 for the cylinders, in a number of a multiple of N/2 of the number (four) of cylinders (two in this case where N=1) and only one projection 21b which corresponds to the cylinder identifying signal pulse.

The operation for the fuel injection control (indicated by the hatched parts) and the ignition control (indicated by the bent arrows) performed by the second embodiment of the present invention shown in FIG. 1 and FIG. 7 will now be described with reference to the timing chart of FIG. 8.

Figure 8:
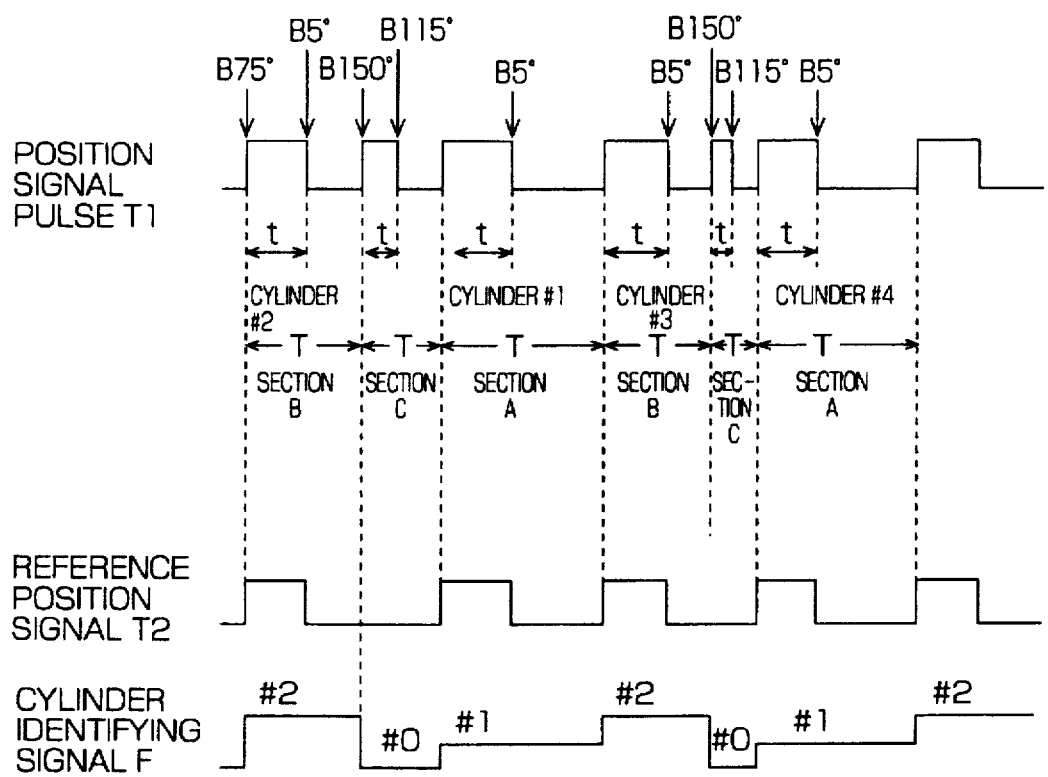
FIG. 8 is a timing chart illustrative of the control of the fuel injection and ignition timings performed by the second embodiment of the present invention.

In FIG. 8, the position signal pulse T1 generated by the position signal generating means 1B is constituted by a pulse which corresponds to cylinder #1 or #4 and a pulse which corresponds to cylinder #2 or #3 because only two projections 21a (half the number of cylinders) are disposed as illustrated in FIG. 7. This configuration makes it possible to identify a group of cylinders #1 and #4 and a group of cylinders #2 and #3. Cylinder #1 can be distinguished from cylinder #2 or #3, but cylinder #1 cannot be distinguished from cylinder #4. For ignition in this case, whenever the cylinder identifying signal F indicates cylinder #1, both cylinders #1 and #4 are subjected to the ignition control indicated by the bent arrows.

For example, if cylinder #1 is almost at the end of the compression stroke and the ignition signal is required, then it means that cylinder #4 is almost at the end of the exhaust stroke. Hence, even if the ignition control on cylinder #4 is implemented at the same time as on cylinder #1, the substantial ignition does not take place in cylinder #4 in the exhaust stroke and no actual harm is rendered to the behavior of the engine. This relationship applies also to cylinders #2 and #3.

The fuel injection control is usually started during the exhaust stroke; however, it is conducted also during the compression stroke as in the case of the ignition control described above.

For instance, as shown in FIG. 8, when the cylinder identifying signal F indicates cylinder #1, fuel is supplied to both cylinders #1 and #4 (refer to the hatched parts) because it cannot be identified whether the signal F corresponds to the exhaust stroke or the compression stroke of cylinder #1.

Thus, the variations in the exhaust gas, accelerating performance, etc. can be prevented as described above by supplying the fuel of the required amount for one induction stroke in two strokes, namely, the exhaust stroke and the compression stroke. Hence, at least the fuel injection control and the ignition control can be implemented through the single sensor related to the crankshaft 19. This enables highly accurate reference position signal T2 and reduced cost of the four-stroke cycle internal-combustion engine which has an even number of cylinders.

Third Embodiment

In the first embodiment, the fuel injection and the ignition are controlled without identifying "true" or "false" of the reference position signal T2 which is obtained in relation to an odd number of cylinders; however, the true timing and the false timing may be identified. For instance, since the cylinder which is controlled at the false timing incurs a misfire, the true timing and the false timing can be identified according to the occurrence of the misfire, so that the ignition control can implemented at the true timing and the fuel injection control at the false timing.

Figure 9:
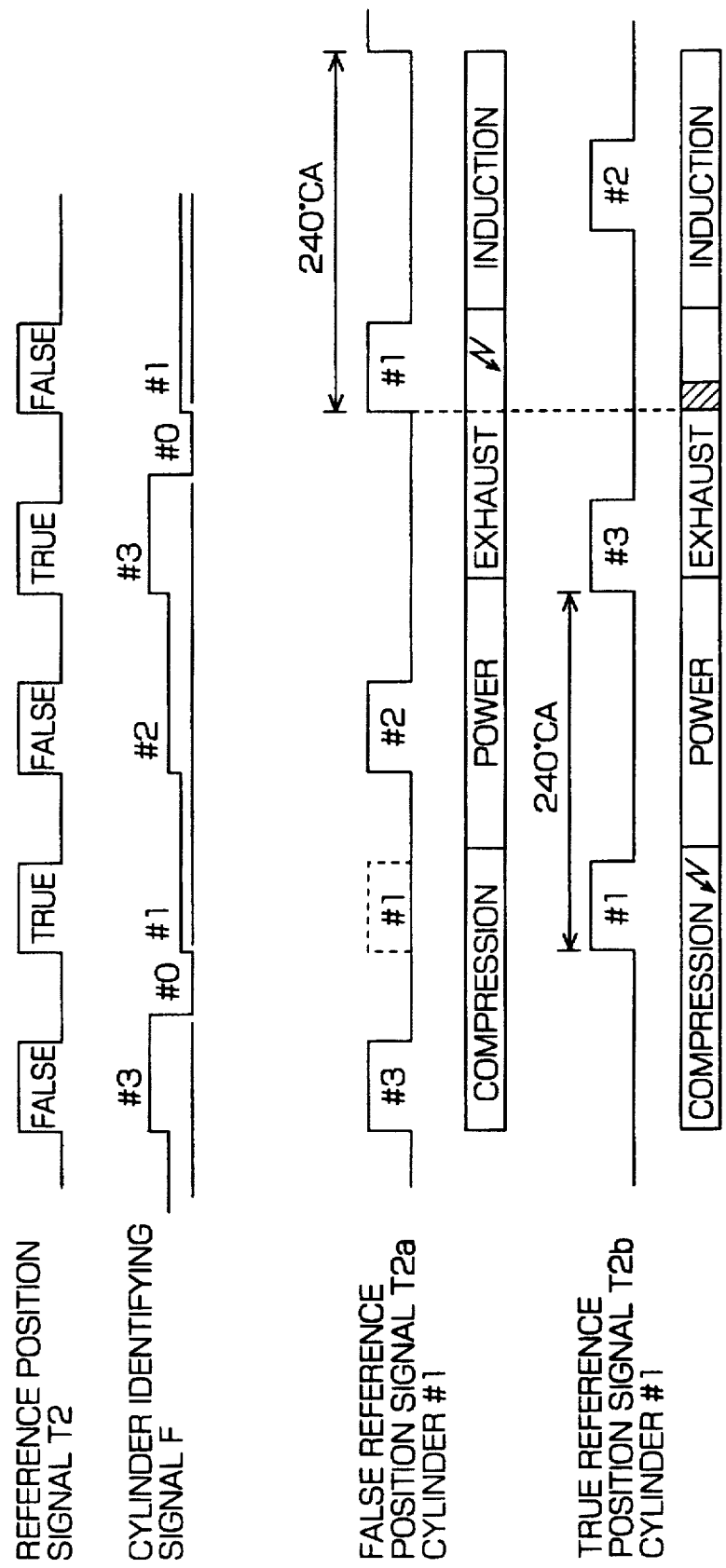
FIG. 9 is a timing chart illustrative of the control of the fuel injection and ignition timings performed by a third embodiment in accordance with the present invention.

The third embodiment of the present invention, wherein the "true" and "false" pulses of the reference position signal T2 an odd number of cylinders are identified, will now be described with reference to the timing chart of FIG. 9.

The third embodiment also refers to a case where three cylinders are involved. The configuration around the position signal generating means 1A is as shown in FIG. 2.

As the method for detecting a misfire in an internal-combustion engine, there is a publicly known art disclosed, for example, in Japanese Patent Laid-Open No. 2-161172.

In the art described in the publication, the engine revolution cycle in the crank angle section which includes the compression top dead center of each cylinder is measured according to the cylinder identifying signal and the crank angle signal and the combustion state (explosion or misfire) in a burning cylinder is detected by a change in the revolution cycle of each cylinder.

In the third embodiment of the present invention, the control means 3A (see FIG. 1) includes a dividing means, not shown. The microprocessor incorporated in the control means 3A applies the aforesaid publicly known art. After the reference position signal T2 and the cylinder identifying signal F are obtained, the microprocessor halves a pulse string of the reference position signal T2 to generate a false reference position signal T2a and a true reference position signal T2b.

However, at the point where the reference position signal T2 has been halved, it cannot be determined which pulse string includes the false reference position signal T2a and which includes the true reference position signal T2b. For this reason, the ignition timing control is implemented tentatively only on cylinder #1 once every two revolutions of the crankshaft 19 in accordance with one pulse string obtained from the aforesaid halving.

At this time, if the pulse string employed for the ignition control is the false reference position signal T2a, then the ignition control indicated by the bent arrows is carried out on cylinder #1 only when cylinder #1 is identified by the cylinder identifying signal F and the false reference position signal T2a. Hence, the ignition control is carried out during the exhaust stroke of cylinder #1 and normal ignition, i.e. power stroke, is not carried out, causing the misfire of cylinder #1 to continue.

The misfire of cylinder #1 is determined by measuring the revolution cycle of the pulses (240 degrees in terms of the crank angle) of the false reference position signal T2a under the misfire condition. If the measured cycle time is long, it means that the power stroke has not been implemented. (Refer to the aforesaid publication.) Accordingly, it can be determined that the pulse string which has been used for the ignition control is the false reference position signal T2a.

In this case, the pulse string of the true reference position signal T2b can be obtained by shifting the current pulse (e.g. corresponding to cylinder #3) of the false reference position signal T2a by one pulse of the reference position signal T2 and halving the reference position signal T2 by using, as the reference, the point at which the next pulse (corresponding to cylinder #1) indicated by the broken line is detected.

On the other hand, if the pulse string used for the ignition timing control for cylinder #1 is the true reference position signal T2b, then the ignition control indicated by the bent arrows is carried out on cylinder #1 only when cylinder #1 is identified by the cylinder identifying signal F and the true reference position signal T2b.

Hence, cylinder #1 is normally ignited and the power stroke is implemented and therefore the revolution cycle of the pulses of the true reference position signal T2b is sufficiently short. As a result, it is determined that cylinder #1 is in a normal combustion condition and that the pulse string used for the ignition control is the true reference position signal T2b. In this case, the ignition control indicated by the bent arrows is performed according to the current pulse of the true reference position signal T2b and the pulse of the cylinder identifying signal F which indicates cylinder #1.

After that, the fuel injection control indicated by the hatched parts is carried out at a point in the exhaust stroke of cylinder #1 where the third pulse from the current pulse (corresponding to cylinder #1) of the true reference position signal T2b occurs, i.e. at a point where two pulses of the reference position signal T2 have elapsed from the aforesaid current pulse. In other words, the aforesaid third pulse is the pulse of the false reference position signal T2a which corresponds to cylinder #1.

Thus, the false reference position signal T2a and the true reference position signal T2b can be recognized by the pulse string of the reference position signal T2 generated by the projections 21a of a multiple of N of the odd number of cylinders. This makes it possible to achieve ideal ignition control in the compression stroke of each cylinder according to the true reference position signal T2b and to achieve effective fuel injection control in the exhaust stroke according to the false reference position signal T2a as in the general conventional practices.

Figure 6:
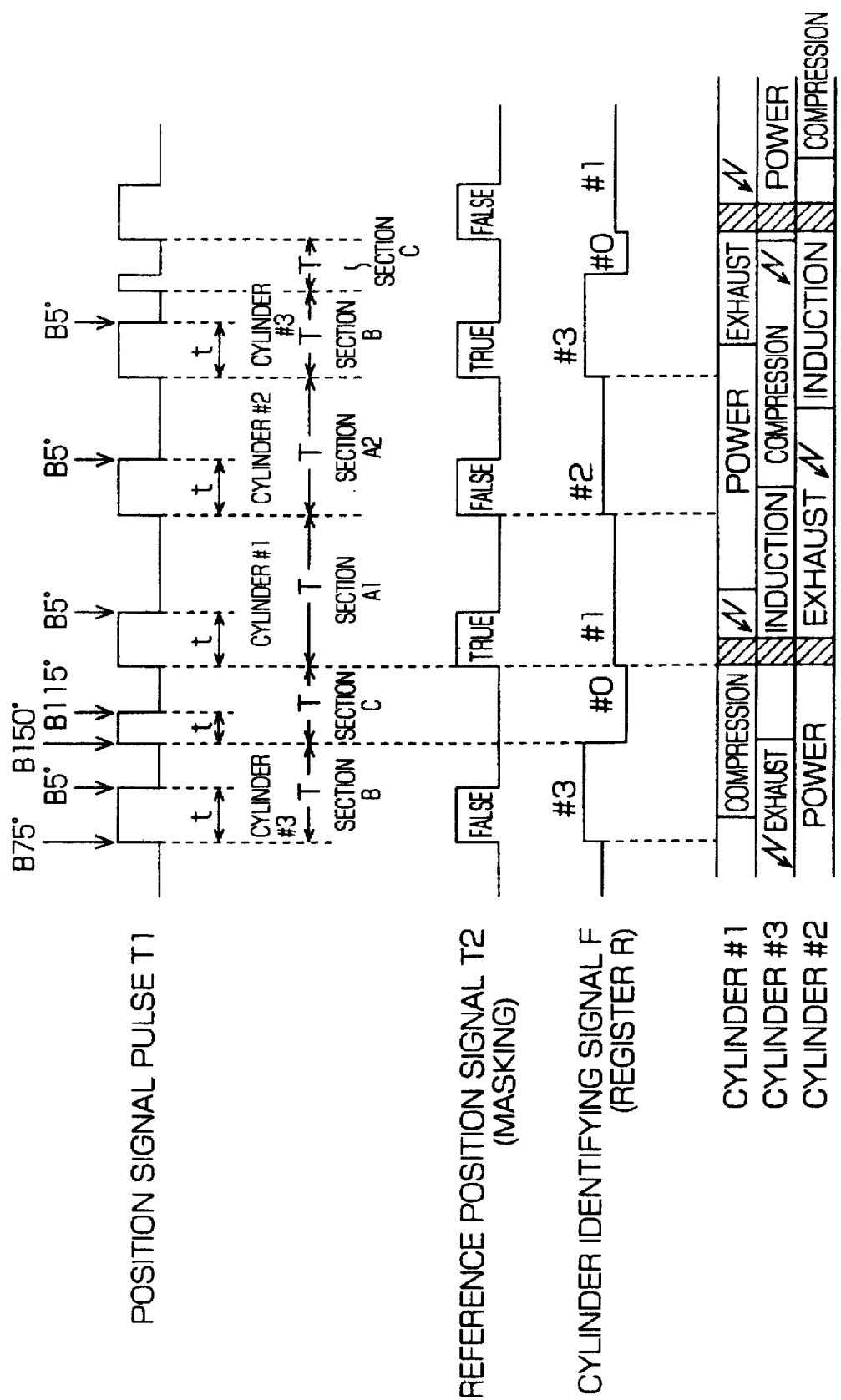
FIG. 6 is a timing chart for illustrating another fuel injection control operation performed by the first embodiment in accordance with the present invention.

If whether the pulse strings, which have been obtained by halving the reference position signal T2, are true or False is determined according to the ignition control of cylinder #1 as stated above, then the ignition control of cylinder #2 and cylinder #3 is carried out in accordance with both true and false pulses included in the reference position signal T2 as in the case of the first embodiment (see FIG. 3 or FIG. 6). This makes it possible to identify a true group and a false group without causing the engine to stop even if cylinder #1 develops a misfire.

The above third embodiment refers to the case wherein the odd number of cylinders are used; when there are an even number of cylinders, the division of the reference position signal T2 into halves is unnecessary. More specifically, in the second embodiment, the ignition control for the particular cylinder, namely, cylinder #1, is conducted once for every two revolutions of the crankshaft 19 and the cycle time of the reference position signal T2 is detected as stated above. This makes it possible to identify whether the cylinder identifying signal pulse included in the position signal pulse T1 corresponds to the compression stroke or the exhaust stroke of cylinder #1. If the compression stroke of cylinder #1 can be identified, then the cylinder identifying signal F enables all cylinders to be identified in the order of cylinder #1, cylinder #3, cylinder #4, and cylinder #2 for each reference position signal T2.

In the third embodiment described above, the ignition control is carried out once on the particular cylinder for every two revolutions of the crankshaft 19 so as to specify the pulse string according to the presence of the misfire. The pulse string, however, can also be specified according to the presence of the misfire by implementing the fuel injection control once on the particular cylinder for every two revolutions of the crankshaft 19.

Further, in the first to third embodiments described above, only one cylinder identifying signal pulse is generated for each revolution of the crankshaft 19 for the particular cylinder, namely, #1; however, a plurality of the cylinder identifying signal pulses may be generated separately for a plurality of cylinders.

Furthermore, the application of the present invention is not limited to a four-stroke cycle internal-combustion engine which has three or four cylinders; the present invention can be applied to a four-stroke cycle internal-combustion engine with an arbitrary number of cylinders. Accordingly, natural number N which decides the number of the projections 21a can be set for an arbitrary value.

What is claimed is:

1. A rotational sensing apparatus for an internal combustion engine having an odd number of cylinders, comprising a disc directly connected to a crankshaft of said engine and a sensor opposing the disc, said disc having:

a plurality of position identifying projections equal to a multiple N of the odd number of cylinders and arranged at equal angular spacing around the circumference of the disc, each of said projections having the same circumferential length, and a cylinder identifying projection positioned between two of the position identifying projections and having a circumferential length different from that of the position identifying projections;

wherein said sensor generates a pulse signal whenever one of the position identifying projections or the cylinder identifying projection passes in front of the sensor.

2. A rotational sensing apparatus for an internal combustion engine having an even number N of cylinders, comprising a disc directly connected to a crankshaft of said engine and a sensor opposing the disc, said disc having:

a plurality of position identifying projections equal to a multiple N/2 of the even number of cylinders and arranged at equal angular spacing around the circumference of the disc, each of said projections having the same circumferential length, and a cylinder identifying projection positioned between two of the position identifying projections and having a circumferential length different from that of the position identifying wherein said sensor generates a pulse signal whenever one of the position identifying projections or the cylinder identifying projection passes in front of the sensor.

3. In a controller for an internal combustion engine having an odd number of cylinders and including a cylinder number counter and a rotational sensing apparatus comprising a disc directly connected to a crankshaft of said engine and a sensor opposing the disc, said disc having:

a plurality of position identifying projections equal to a multiple N of the odd number of cylinders and arranged at equal angular spacing around the circumference of the disc, each of said projections having the same circumferential length; and a cylinder identifying projection positioned between two of the position identifying projections and having a circumferential length different from that of the position identifying projections;

wherein said sensor generates a pulse signal whenever one of the position identifying projections or the cylinder identifying projection passes in front of the sensor; a microprocessor responsive to the pulses generated by the sensor, for:

a. calculating the width t of each pulse;

b. calculating the period T of each pulse, wherein the period is defined as the time from the rise of a given pulse to the time of the rise of an immediately succeeding pulse;

c. calculating the pulse time ratio defined as t/T;

d. calculating a difference quotient value α corresponding to the pulse time ratio of the current pulse and the pulse time ratio of an immediately preceding pulse; and e. when α is less than a predetermined reference value, incrementing the cylinder number counter, and otherwise resetting the cylinder number counter.

4. The microprocessor of claim 3, further performing a masking operation after resetting the cylinder number counter.

5. The microprocessor of claim 3, further generating an ignition spark command each time said α is determined to be less than said predetermined reference value.

6. A controller for a four-stroke cycle internal combustion engine having an even number of cylinders, said controller comprising:

position signal generating means mounted on a crankshaft of said internal-combustion engine for generating a position signal in synchronization with the revolution of said crankshaft, said position signal including a plurality of reference position pulses generated during each revolution of said crankshaft and a cylinder identifying pulse which is generated for a particular cylinder, the number of the reference position pulses generated during each crankshaft revolution being a multiple of N/2 (N is a natural number) of the number of cylinders;

a reference position signal generating section for identifying the reference position of each cylinder from said position signal and for generating a reference position signal;

a cylinder identifying section for identifying said each cylinder from said position signal and for generating a cylinder identifying signal; and a timing control section for generating a control signal for said each cylinder in accordance with said reference position signal and said cylinder identifying signal.

7. The controller according to claim 6, wherein said control signal causes the controller to generate at least one of ignition spark and fuel injection for N/2 of said cylinders concurrently at each of said reference position pulses.

8. The controller according to claim 6, further comprising:

cylinder identifying means for controlling at least one of ignition timing and fuel injection timing of one of the even number of cylinders once for every two revolutions of said crankshaft in accordance with said reference position signal, for checking whether the combustion state of said one of the even number of cylinders is a misfire or not according to a change in the rotational speed of said crankshaft, and for identifying a true reference position signal for a compression stroke of said each cylinder according to the checking result of said combustion state.

9. The controller according to claim 6, wherein said N/2 cylinders are assigned to groups, each having at least two cylinders, and wherein said controller is responsive to a reference position pulse of an assigned cylinder to generate ignition spark for all cylinders belonging to the group of said assigned cylinder.

10. A controller for a four-stroke cycle internal-combustion engine having an odd number of cylinders, said controller comprising:

position signal generating means mounted on a crankshaft of said internal-combustion engine for generating a position signal in synchronization with the revolution of said crankshaft, said position signal including a plurality of reference position pulses generated during each revolution of said crankshaft, and a cylinder identifying pulse which is generated for a particular cylinder, the number of the reference position pulses generated during each crankshaft revolution being a multiple of N (N is a natural number) of the odd number of cylinders;

a reference position signal generating section for identifying a reference position for each cylinder from said position signal and generating a reference position signal;

a cylinder identifying section for identifying said cylinders from said position signal and for generating a cylinder identifying signal; and a timing control section for generating a control signal for each cylinder in accordance with said reference position signal and said cylinder identifying signal.

11. The controller according to claim 10, further comprising:

dividing means for halving said reference position signal to generate divided reference position signals; and cylinder identifying means for controlling at least one of ignition timing and fuel injection timing of one of the odd number of cylinders once for every two revolutions of said crankshaft in accordance with said divided reference position signal, for checking whether the combustion state of said one of the odd number of cylinder indicates a misfire or not according to a change in the rotational speed of said crankshaft, and for identifying a true reference position signal for a compression stroke of said each cylinder according to the checking result of said combustion state.

12. The controller according to claim 10, wherein said controller performs masking operation to alternately designate said reference position pulses as true/false, and generates ignition spark and fuel injection only during periods in which the reference position pulses are designated as true.

13. The controller according to claim 1, wherein said controller is responsive to said reference position pulses to alternately designate said reference position pulses as true/false and generate ignition spark in one of said cylinders when a respective reference position pulse is designated true, and wherein said controller is responsive to a misfire detection in said one of said cylinders to charge the true designation into a false designation and the false designation into a true designation.

14. The controller according to claim 10, wherein said control signal causes the controller to generate at least one of ignition spark and fuel injection for each of said cylinders at each of said reference position pulses.

15. The controller according to claim 14, wherein said control signal further causes said controller to generate fuel injection of half the full amount required for normal engine operation.

* * * * *